Dec. 15, 1931.   R. S. PORTHAM   1,837,066
THERMOSTATIC CONTROL DEVICE
Filed Oct. 30, 1928   2 Sheets-Sheet 2
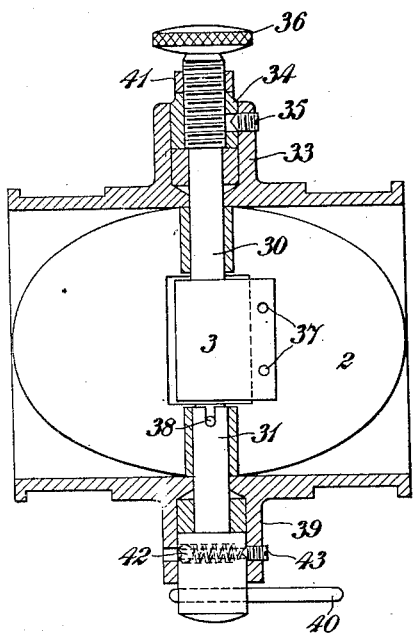
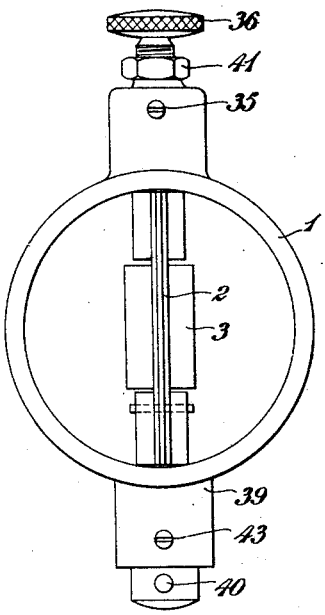
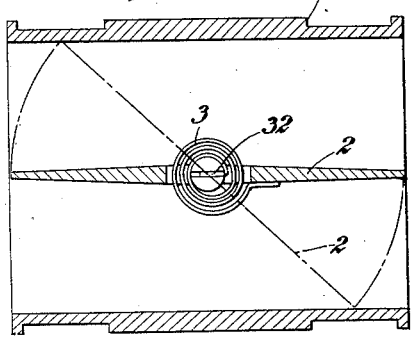

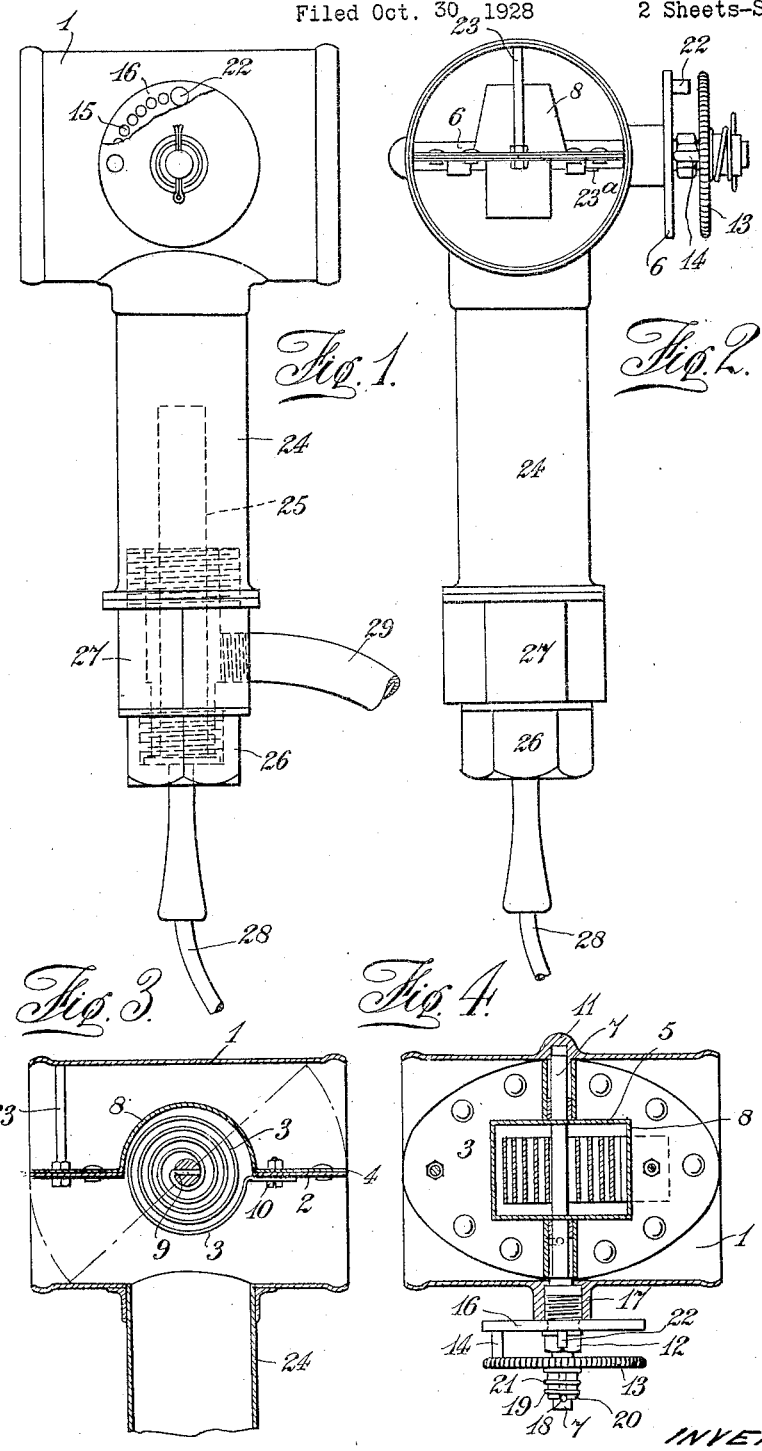

Patented Dec. 15, 1931

1,837,066

UNITED STATES PATENT OFFICE

ROLAND SYDNEY PORTHAM, OF STRAND, LONDON, ENGLAND

THERMOSTATIC CONTROL DEVICE

Application filed October 30, 1928, Serial No. 316,051, and in Great Britain April 3, 1928.

The present invention relates to thermostatic control devices more particularly for controlling the flow of cooling water from the jacket of an internal combustion engine to a radiator of a type in which a valve is controlled by thermostatic metal preferably in the form of a volute spring and is chiefly intended for use in connection with automobiles or the like.

The object of this invention is to provide means for readily and conveniently adjusting the thermostatic member and/or the valve associated therewith so that the automatic movement of the valve can be controlled or adjusted as required to suit various makes of engines, and various conditions.

A further object is to provide a compact and self-contained unit, which can be fitted between the water jacket and the radiator of an internal combustion engine and easily set or adjusted to control the flow of the circulating cooling water, said unit being fitted with means to give a visible indication that the valve is being operated by the thermostatic member.

A still further object is to provide manually operable means whereby the valve may be set to a partially open position, in such a manner that the valve may be further actuated by the thermostatic member or to a fully open position.

With these and other objects in view, the invention is characterized, in that, means are provided for the control or adjustment of the thermostatic member and/or the valve working in conjunction therewith, said means being preferably arranged, that the adjustment for various temperatures can be effected while the device is in use or operation.

The invention further consists in providing manual means for controlling the valve, independently of thermostatic means, and in providing means whereby the valve will be maintained in its full open position, when the thermostat is operated under exceptionally high temperatures or when it is desired not to employ the thermostatic member.

The invention still further consists in providing a spring controlled valve, with externally arranged means which will indicate that the thermostatic member is operating the valve, and which will indicate the degree of opening.

The invention will now be described with reference to the accompanying drawings, in which:—

Figure 1 is a side elevation of one form of thermostat control device constructed according to this invention, part of the manipulating knob being broken away for clearness;

Figure 2 is an end elevation thereof;

Figure 3 is a part longitudinal section of the device shown in Figure 1;

Figure 4 is a sectional plan;

Figure 5 is a sectional plan of a modified construction;

Figure 6 is an end elevation thereof, and

Figure 7 is a longitudinal section of the device shown in Figure 5.

As shown more particularly in Figures 1 to 4 the improved thermostatic control device comprises a short length of pipe forming a substantially cylindrical casing 1 in which is mounted a valve member 2 having a thermostatic member 3 connected thereto. The cylindrical casing 1 is adapted to be connected in an easily fixed and removable manner, preferably by short lengths of rubber hose, not shown, to the radiator and to the top of the cylinder block of an internal combustion engine so that the cooling water is compelled to flow through the entire casing 1 when the valve 2 is in open position. The valve member 2 is in the form or shape of a disc or butterfly valve and consists of a pair of metal plates riveted or otherwise secured together with a felt or other pad 4 therebetween. The pad 4 is of slightly larger size than the shaped metal plates so that the outer edge of the said pad will contact with the inner wall of the casing 1 and provide a substantially fluid tight valve structure when closed. The valve member 2 is slotted at 5 and stamped with corrugations or the like 6 at right angles to the slot 5 so as to form a strap or bearing for mounting the valve 2 on a spindle 7. On the valve member 2 and over the slot 5 is provided a pressed, stamped or otherwise formed hood or the like 8 for the purpose of housing the thermostatic member 3. The said hood 8 may, if desired, be provided with a small aperture so as not to prevent all circulation of the cooling medium but to permit of a small amount of circulation to take place when the valve 2 is in its closed position. The thermostatic member 3, preferably formed in the usual manner of duplex metal prepared by the permanent union through their length of two metals with widely differing co-efficients of expansion, is coiled to a spiral and one end is anchored to the spindle 7 in any suitable manner preferably by forming a slot or a saw cut 9 in the said spindle 7 for the reception of the inner end of the said spiral thermostatic member 3. The other end of the spiral thermostatic member 3 is fixed in any suitable manner as shown at 10 to the valve member 2. One end of the spindle 7 is mounted in a bearing 11 formed on the casing 1 and the other end of the said spindle 7 is adapted to pass through the casing 1 provided with a suitable watertight gland 12. It will be understood that the controlling valve member 2 is loosely mounted on the spindle 7 so that the said valve is free to rotate thereon. Slidably mounted on the outer end of the spindle 7 is an operating disc or knob 13 formed or provided with a pin or extension 14 which is adapted to co-operate with one of a plurality of recesses 15 arranged in circular formation on a plate or the like 16 secured in any suitable manner on the casing 1. This plate 16 is formed or provided with a boss 17 and in this boss is fitted the gland 12 in which the spindle 7 is adapted to rotate. The manipulating disc or knob 13 is held against relative rotation on the spindle 7 by means of a pin or the like 18 detachably secured in the said spindle 7 and engaging in oppositely arranged slots or recesses 19 provided on a boss 20 formed on the manipulation disc or knob 13. On the boss 20 is mounted a coiled spring 21 which has a bearing at one end against the pin 18 and at its other end on the manipulating disc or knob 13. The arrangement is such that the pin 14 on the disc or knob 13 will be held in one of the recesses 15 formed on the plate or the like 16. Thus the disc or knob 13 can be drawn outwardly and rotated to enable the thermostatic member 3 to be wound or unwound to any desired tension and locked in the adjusted position by the pin 14 engaging in one of the plurality of holes 15 formed on the plate 16. If desired an additional stop 22 may be provided on the plate 16 to co-operate with the pin 14 and lock the thermostatic member 3 in its fully open position and to prevent the overwinding of the said thermostatic member 3. An additional pin or stop 23 may be provided on the valve 2 to co-operate with the casing 1 and maintain the valve 2 in its fully opened or horizontal position when moved by the thermostatic member 3. Thus the valve 2 can be moved and held in its open position through the medium of the manipulating knob 13 and the co-operating pin and stop 14 and 22 respectively, or automatically retained in its open position by the stop or pin 23 when the valve is actuated by the thermostatic member 3. If desired, and as shown, an additional pin 23a may be provided on the spindle 7 to co-operate with the valve 2 so that the valve 2 may be maintained in its fully open position regardless of the action of the thermostatic member. Instead of providing recesses 15 in the plate 16, holes may be provided or the plate 16 may be provided with a pin to co-operate with holes or recesses formed in the knob or alternatively a spring arm having an indentation or the like may be provided on one member to engage a serrated or saw edged surface formed on the other member. The above described unit is fitted between the engine and the radiator and thus the thermostatic member 3 will be in the direct path of the cooling liquid from the engine to the radiator and will be actuated by the temperature of the liquid coming from the engine. If desired an indicating disc may be provided on the plate 16 and marked according to the recesses in the plate 16 with degrees of temperature. Thus the manipulating knob can be turned to set or tension the thermostatic member so that it will position the valve to maintain the cooling liquid at the desired temperature. When the temperature of the cooling liquid varies above or below the desired temperature the valve will be actuated by the thermostatic member so that the desired temperature will be maintained. Thus the tension of the thermostatic member may be adjusted and act as a thermometer.

The above described unit may be suitably modified so that it may be inserted in one end of a rubber hose usually connected to the outlet pipe of the engine block and to the inlet pipe of the radiator. In this case a circular aperture would be cut in the hose so that the spindle for mounting the valve could be passed through the said aperture and a watertight gland provided in the casing. Thus it will be seen that the complete unit can be fitted within the rubber hose and that the only part projecting will be the plate and the manipulating disc or knob.

If desired, and as shown, the casing 1 is of T-shape so as to form a downwardly extending cylindrical extension 24 and in this vertical extension 24 may be housed a thermometer or the like 25 for indicating the temperature of the cooling water in the engine jacket. This thermometer 25 is held in position in the extension 24 by a nut or the like 26 screwed on to another nut like extension 27 also secured to the lower end of the extension 24. The thermometer 25 is in communication with a tube 28 which is connected to any suitable form of indicating dial not shown preferably secured on the dash board of the car. Thus the temperature of the cooling water can be readily observed by the driver of the car. To the nut like member 27 is secured a by-pass pipe 29 which is connected, for instance to the suction side of the water circulating pump in the case of a pump cooled engine. In this case and when the valve 2 is in its closed position the circulation will be through the engine block and not through the radiator. Thus the cooling medium will heat up rapidly since the said cooling medium is throttled or limited to a very small amount by the closed or partially closed valve. When the cooling medium in the jacket reaches a certain temperature, the thermostatic member 3 will operate and gradually open the valve 2 to permit of the circulation of the cooling liquid through the radiator. When normal running conditions are obtained with the cooling liquid at the desired temperature, the valve will be partially opened. Should the temperature rise the thermostatic member 3 will cause the valve 2 to further open thereby increasing the flow of cooling medium and cause the temperature of the water to fall to the predetermined value. When the valve 2 is in approximately the horizontal position, the stop 23 engages the casing 1 and thus any further increase in temperature of the cooling liquid will not further actuate the valve. On the other hand should the temperature fall below that desired the thermostatic member 3 will cause the valve 2 to gradually close until the cooling medium reaches the temperature to which it is desired to keep it. Thus it will be seen that the flow of water will be automatically controlled to maintain the circulating water at the desired temperature. Further the arrangement is such as to permit of the rapid heating up of the water in the cylinder block on the coldest day. Should the setting be incorrect, it is an easy matter to readjust the tension of the thermostatic member so that it will operate the valve 2 at either higher or lower temperatures. This operation being accomplished by simply turning the externally arranged manipulating knob 13 without employing any tools or dismantling the device.

In a modification and as shown in Figures 5, 6 and 7 the spindle is in two parts 30 and 31. One portion 30 is provided with a slot or the like 32 and in this slot is positioned one end of the thermostatic member 3. This portion 30 extends through the casing 1 and is free to rotate in a bearing 33. Preferably the outer end of this portion 30 is threaded for the reception of a collar 34 which is held against axial movement of the bearing by a pin, set screw, or the like 35. The outer end of the portion 30 is formed or fitted with a regulating head 36 whereby the tension of the thermostatic member 3 may be adjusted. The outer end of the thermostatic member 3 is secured in any suitable manner such as by rivets 37 of the valve 2 and this valve 2 is freely mounted on the portion 30 of the spindle and is secured in any suitable manner preferably by a pin and slot connected 38 to the other portion 31 of the spindle. The portion 31 of the spindle is rotatably mounted in a bearing 39 formed on the opposite side of the casing 1 and this outer end of the portion 31 of the spindle is fitted with an indicating arm, pointer or the like 40. This arm or pointer 40 will move in accordance with the valve 2 and thus indicate that the valve is functioning and the degree of opening. In this case the regulating head 36 after adjustment of the thermostatic member 3 or placing the valve 2 in the full open position may be locked in any suitable manner by, for instance, a lock nut 41 adapted to screw on the threaded portion of the spindle 30. The portion 31 of the spindle is bored for the reception of a spring pressed ball or the like 42 which is adapted to co-operate with a pin or set screw 43 when the valve 2 is in its full open or horizontal position. Thus the arrangement is such that the valve 2 will only have partial rotation. If desired a plurality of thermostatic members of any desired shape or form may be employed. The thermostatic member may be corrugated and/or may have holes punched or otherwise formed in some or all of its turns to permit of the circulation of the cooling water through the thermostatic member and prevent clogging of the said member.

In the above described constructions, the thermostatic member is in the form of a volute spiral and the turns are arranged around the spindle, but it will be understood that any other form of spring member may be provided such as a flat spring-like thermostatic member which can be adjusted to act on the valve at any desired temperature of the cooling water, or the volute spiral thermostatic member may have its turns arranged around a spindle disposed longitudinally of the casing so as to permit the cooling medium to flow through the space between the turns. This arrangement would prevent any deposit forming between the turns, or, should any be formed, the washing action taking place by the flow of the cooling water would tend to keep the space between the turns free from such deposit. In this latter arrangement one end of the thermostatic member would be connected to the spindle of an apertured disc-like valve moving in relation to an apertured plate fitted in the casing. The other end of the thermostatic member would be connected through the medium of a threaded spindle to a manipulating knob arranged externally of the casing. Thus the tension of the thermostatic member could be controlled externally of the casing so that it would automatically open or close the apertures of the valve at the desired temperature according to the setting of the said thermostatic member.

Any of the above described units may be used in conjunction with a water cooling circulating system employing a pump, or with other types of circulating systems and it may be fitted either in the outlet pipe of the engine block or in the outlet pipe of the radiator connected to the inlet pipe of the engine jacket.

Thus it will be seen that I have provided thermostatic control devices which can be adjusted to operate at any specific temperature to suit any type of engine or various conditions and at the same time allow the valve to be manually placed in the full open position and to give visible indication of the valve's operations, the adjustment of the thermostatic control device being effected externally by manually manipulated means during the running of the engine.

What I claim is:—

1. A means for controlling the circulation of the cooling water of internal combustion engines including a conduit for the passage of the cooling medium, a disk valve in said conduit controlling said passage, a shaft mounted on the conduit on which the valve is rotatably supported, a thermostatic element forming the connection between the valve and shaft and serving to operate the valve in accordance with the temperature of the cooling medium, a disk having sliding connection with the shaft beyond the conduit, said disk being otherwise fixed to the shaft and serving to rotate the shaft for adjustment of the thermostatic element, and means carried by the conduit whereby the disk and thereby the shaft may be held in any predetermined adjusted position.

2. A means for controlling the circulation of the cooling water of internal combustion engines including a conduit for the passage of the cooling medium, a disk valve in said conduit controlling said passage, a shaft mounted on the conduit on which the valve is rotatably supported, a thermostatic element forming the connection between the valve and shaft and serving to operate the valve in accordance with the temperature of the cooling medium, a disk having sliding connection with the shaft beyond the conduit, said disk being otherwise fixed to the shaft and serving to rotate the shaft for adjustment of the thermostatic element, and means carried by the conduit whereby the disk and thereby the shaft may be held in any predetermined adjusted position, said means being formed to limit adjusting movement of the disk in one direction.

3. A means for controlling the circulation of the cooling water of internal combustion engines including a conduit for the passage of the cooling medium, a disk valve in said conduit controlling said passage, a shaft mounted on the conduit on which the valve is rotatably supported, a thermostatic element forming the connection between the valve and shaft and serving to operate the valve in accordance with the temperature of the cooling medium, a disk having sliding connection with the shaft beyond the conduit, said disk being otherwise fixed to the shaft and serving to rotate the shaft for adjustment of the thermostatic element, means carried by the conduit whereby the disk and thereby the shaft may be held in any predetermined adjusted position, and means within the conduit to limit thermostatic operation of the valve in one direction to a fully opened valve position.

4. A means for controlling the circulation of the cooling water of internal combustion engines including a valve arranged in the path of circulation of the cooling medium, a shaft providing an axial support for the valve, a thermostatic element connected to the valve and shaft and seated in an opening formed in the valve, and means carried by the valve to limit movement thereof in one direction to fully open valve position.

5. A means for controlling the circulation of the cooling water of internal combustion engines including a valve arranged in the path of circulation of the cooling medium, a shaft providing an axial support for the valve, a thermostatic element connected to the valve and shaft and seated in an opening formed in the valve, means carried by the valve to limit movement thereof in one direction to fully open valve position, manually operable means for adjusting the thermostatic element, and means cooperating with the manually operable means to limit said adjustment in both directions to thereby prevent overtensioning of the thermostatic element in one direction and define complete open relation of the thermostatic element in the other direction.

In testimony whereof I have hereunto signed my name.

ROLAND SYDNEY PORTHAM.